United States Patent [19]
Pizzi

[11] Patent Number: 6,023,149
[45] Date of Patent: Feb. 8, 2000

[54] CHARGE OR DISCHARGE CIRCUIT

[75] Inventor: Raymond J. Pizzi, Brick, N.J.

[73] Assignee: The United States of America as represented by the Secretary of the Army, Washington, D.C.

[21] Appl. No.: 09/251,990

[22] Filed: Feb. 17, 1999

Related U.S. Application Data

[63] Continuation of application No. 08/697,047, Aug. 19, 1996.
[51] Int. Cl.[7] .................................. H02J 7/14; H02J 7/00
[52] U.S. Cl. ......................... 320/128; 320/137; 320/162
[58] Field of Search ................................... 320/128, 137, 320/162

[56] References Cited

U.S. PATENT DOCUMENTS

| | | | |
|---|---|---|---|
| 3,805,145 | 4/1974 | Gordon | 323/16 |
| 4,302,726 | 11/1981 | Shobbrook | 330/260 |
| 4,388,582 | 6/1983 | Saar et al. | 320/156 |
| 4,390,828 | 6/1983 | Converse et al. | 320/153 |
| 4,398,139 | 8/1983 | Prinsze | 320/114 |
| 4,924,169 | 5/1990 | Shifflet et al. | 320/112 |
| 5,856,737 | 1/1999 | Miller et al. | 320/152 |
| 5,905,361 | 5/1999 | Saeki et al. | 320/125 |

Primary Examiner—Peter S. Wong
Assistant Examiner—Gregory J. Toatley, Jr.
Attorney, Agent, or Firm—Michael Zelenka; John M. O'Meara

[57] ABSTRACT

A feedback circuit for passing uniformly constant current relative to charge storing devices is disclosed. An open circuit is disposed between two terminals in a feedback loop and these terminals are interconnected through the charge storing devices to close the open circuit, when the uniformly constant current is to-flow for the purpose of either charging or discharging such devices. The feedback loop is included in a voltage regulator which in the preferred embodiments, is comprised only of an operational amplifier and a resistance.

7 Claims, 2 Drawing Sheets

CHARGE OR DISCHARGE CIRCUIT

This application is a continuation of Ser. No. 08/697,047, filed Aug. 19, 1996.

GOVERNMENT INTEREST

The invention described herein may be manufactured, used, imported, sold and licensed by or for the Government of the United States of America without the payment to me of any royalty thereon.

BACKGROUND OF THE INVENTION

This invention relates to a circuit for charging or discharging electric charge storing devices and more particularly, one which substantially applies a uniformly constant flow of charge or current relative to such devices.

When various types of batteries are repeatedly re-charged, weak cells may develop therein to cause a reversible loss in the charge storing capacity thereof. This loss can be substantially nullified by discharging such batteries before each recharging, to drop the voltage thereacross below the normal operating level thereof. Furthermore, to enhance the life of such batteries, current flow relative thereto during each discharge or recharge cycle should be held uniformly constant. Presently however, commercially available battery restoration equipment utilizes circuitry of unnecessary complexity to maintain such constant current flow. Also, this circuitry controls the magnitude of current flow by switching through a sequence of resistors as the battery voltage changes and therefore, it fails to maintain such current flow uniformly constant because a stepped sequence of unequal current levels are derived therewith.

SUMMARY OF THE INVENTION

It is the general object of the present invention to substantially maintain uniformly constant current flow relative to charge storing devices.

It is the specific object of the present invention to substantially maintain uniformly constant current flow while discharging charge storing devices.

It is another specific object of the present invention to substantially maintain uniformly constant current flow while charging charge storing devices.

These and other objects of the present invention are accomplished with a feedback circuit having an open circuit disposed therein between two terminals which are interconnected through the charge storing devices when uniformly constant current is to flow relative to such devices. In the preferred embodiments, the feedback circuit includes an operational amplifier having its output connected to one open circuit terminal and its inverting input connected to the other open circuit terminal.

The scope of the present invention is only limited by the appended claims for which support is predicated on the preferred embodiments set forth hereafter in the following description and the attached drawings wherein like reference characters relate to like parts throughout the figures thereof.

DESCRIPTION OF THE PREFERRED EMBODIMENTS

Figure 1:
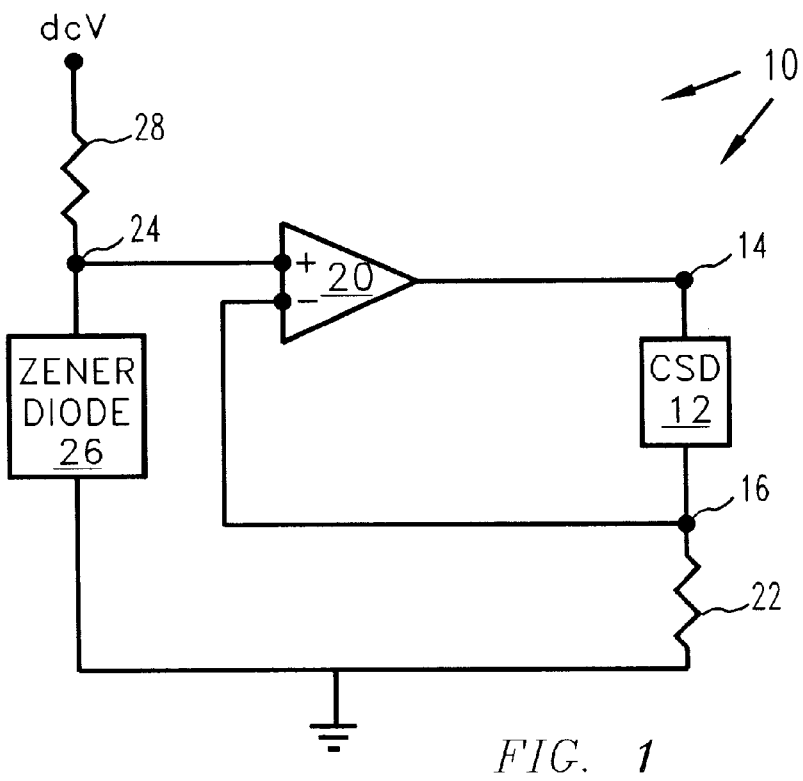
FIG. 1 is a schematic/block diagram for a preferred embodiment of the invention.

In accordance with the invention, FIG. 1 relates to a regulator circuit 10 for substantially passing uniformly constant current relative to at least one charge storing device hereinafter CSD)12, such as a battery. The CSD 12 is not a part of the regulator 10 and is only connected thereto between terminals 14 and 16 in a feedback loop thereof, when uniformly constant current is to flow relative to the CSD 12. Otherwise, an open circuit exists between terminals 14 and 16, while the feedback loop is directed about an operational amplifier (hereinafter op amp) 20. A noninverting input on the op amp 20 is connected to a terminal 24, while an output thereon is connected to terminal 14 and an inverting input thereon is connected to terminal 16. Therefore, the feedback loop interconnects the output and the inverting input on the op amp 20. A resistance 22 is also disposed in the regulator 10 between terminal 16 and ground, while a zener diode 26 is series connected with a resistance 28 between ground and a dc voltage source, to apply a reference voltage at terminal 24.

When the CSD 12 is connected between terminals 14 and 16 of the regulator 10, uniformly constant current flows relative thereto, rather than the stepped sequence of constant current levels derived with prior art circuitry. The magnitude of the uniformly constant current is determined by the magnitude of the resistance 22 and the magnitude of the feedback voltage at terminal 16. As is well known to those skilled in the art of operational amplifiers, no current will flow relative to the noninverting and inverting inputs of op amp 20. Furthermore, the opposite polarities of the noninverting and inverting inputs combine with the very high gain of op amp 20, to result in an infinitesimal voltage differential (better known as the "error") between those inputs which renders the voltages thereat essentially equal. Therefore, the current flow relative to the CSD 12 is independent of the voltage thereacross and the uniformly constant magnitude of that current is only dependent on the magnitudes of the resistance 22 and the reference voltage at terminal 24. Consequently, the magnitudes of either or both the reference voltage at terminal 24 and the resistance 22 can be set to determine the magnitude of the uniformly constant current. Furthermore, CSD's connected between terminals 14 and 16 to close the open circuit within the feedback loop, can be either charged or discharged by the uniformly constant current which flows relative thereto.

Figure 2:
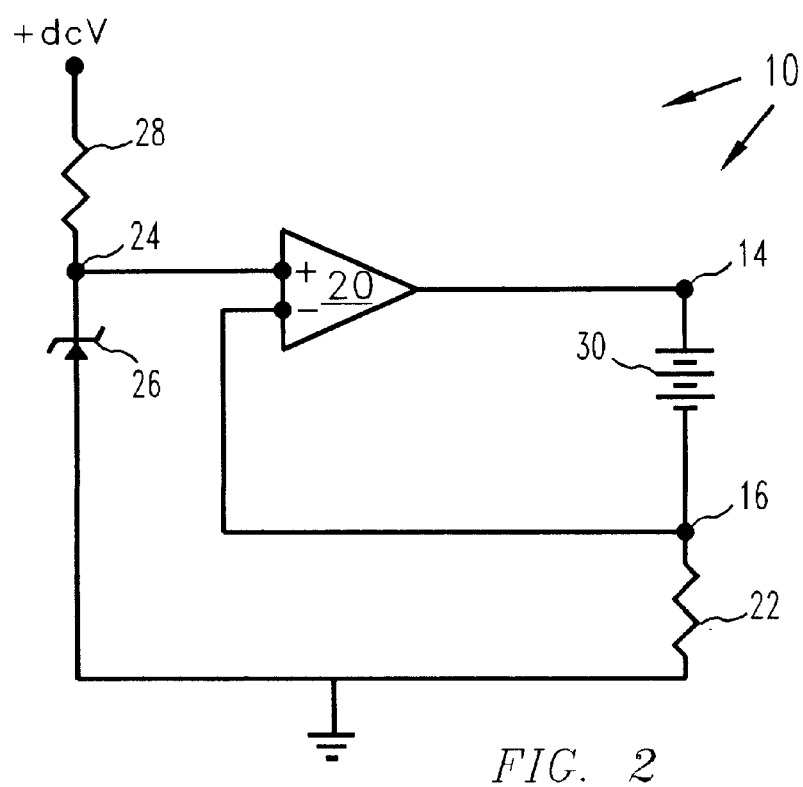
FIG. 2 is an adaptation of the FIG. 1 schematic/block diagram for charging batteries.

In FIG. 2, a battery 30 to be charged is disposed between terminals 14 and 16 of the regulator 10, with the positive battery terminal connected to terminal 14 and the negative battery terminal connected to terminal 16. To apply a positive dc reference voltage at the noninverting input of op amp 20, the dc voltage source is made positive while the zener diode 26 is disposed with its anode connected to ground. This substantially results in the flow of uniformly constant current from the output of the op amp 20 to ground, which thereby charges the battery 30 to substantially the magnitude of the reference voltage at terminal 24. The regulator 10 of FIG. 2 is readily converted from a charging mode to a discharging mode by disposing the battery 30 between terminals 14 and 16 of the regulator 10, with the negative battery terminal connected to terminal 14 and the positive battery terminal connected to terminal 16 in the manner shown by FIG. 3. Although somewhat more cumbersome, this mode conversion of the FIG. 2 regulator 10 can also be achieved by changing the dc reference voltage applied to the noninverting input of the op amp 20 from positive to negative. To apply a negative dc reference voltage at the noninverting input of the op amp 20, the dc voltage source can be made negative while the zener diode 26 is disposed with its cathode connected to ground in the manner shown by FIG. 3. Flow of the uniformly constant current continues until the battery 30 is disconnected from the terminals 14 and 16.

Figure 3:
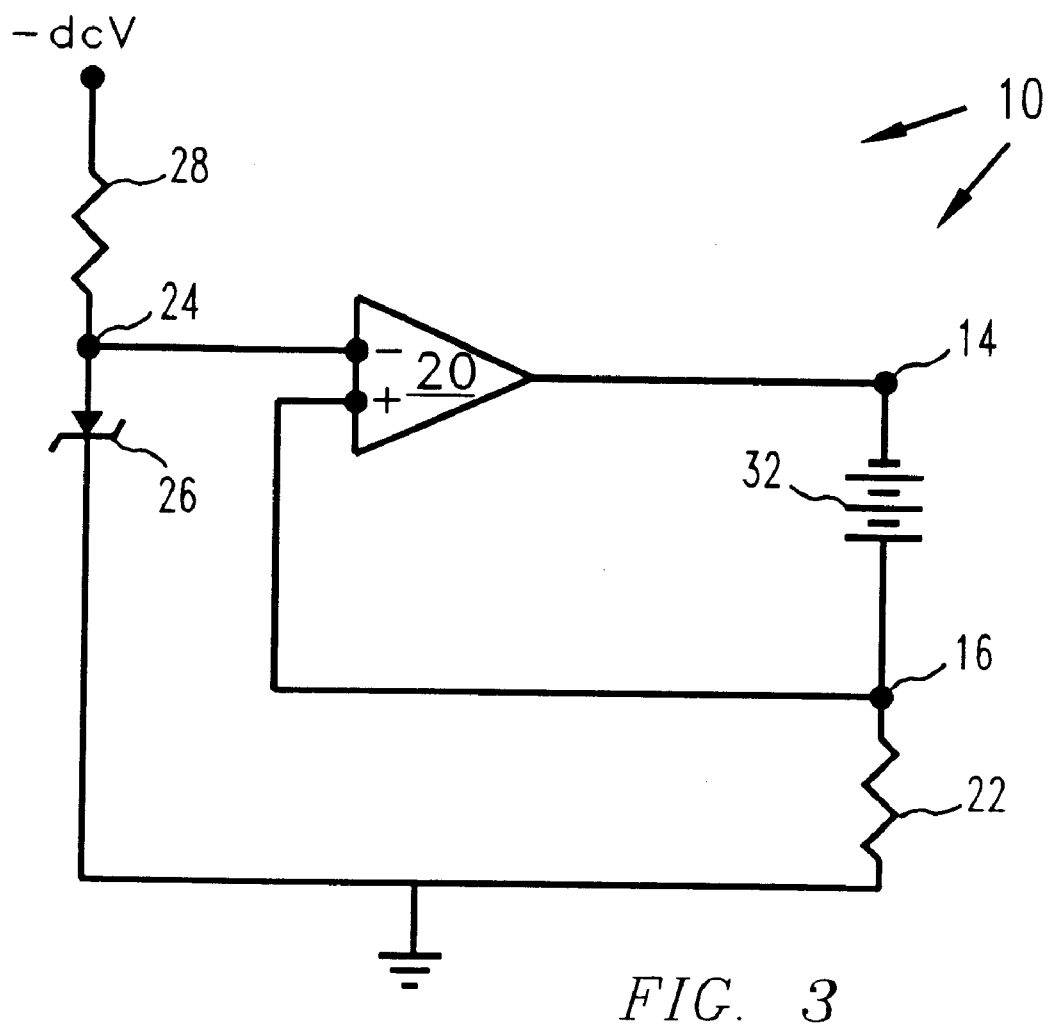
FIG. 3 is an adaptation of the FIG. 1 schematic/block diagram for discharging batteries.

In FIG. 3, a battery 32 to be charged is disposed between the terminals 14 and 16, with the negative battery terminal connected to terminal 14 and the positive battery terminal connected to terminal 16. To apply a negative dc reference voltage at the noninverting input of op amp 20, the dc voltage source is made negative while the zener diode 26 is disposed with its cathode connected to ground. This substantially results in the flow of uniformly constant current from ground to the output of the op amp 20, which thereby charges the battery 32 to substantially the magnitude of the reference voltage. The regulator 10 of FIG. 3 is readily converted from a charging mode to a discharging mode by disposing the battery 32 between terminals 14 and 16 of the regulator 10, with the negative battery terminal connected to terminal 16 and the positive battery terminal connected to terminal 14 in the manner shown by FIG. 2. Although somewhat more cumbersome, this mode conversion of the FIG. 3 regulator 10 can also be achieved by changing the dc reference voltage applied to the noninverting input of the op amp 20 from negative to positive. To apply a positive dc reference voltage at the noninverting input of the op amp 20, the dc voltage source can be made negative while the zener diode 26 is disposed with its anode connected to ground in the manner shown by FIG. 2. Flow of the uniformly constant current continues until the battery 32 is disconnected from the terminals 14 and 16.

More than one CSD 12 in FIG. 1 or battery 30 and 32 in FIGS. 2 and 3 respectively, can be charged or discharged simultaneously with the regulator 10 of the invention. Furthermore, well known circuit theory can be applied to connect a plurality of CSD's 12 or batteries 30 and 32 in either series or parallel between the terminals 14 and 16 of FIGS. 1–3.

Those skilled in the art of charge and discharge circuitry will appreciate without any further explanation that within the concept of this invention, many modifications and variations are possible to the above disclosed embodiments of the regulator 10. Consequently, it should be understood that all such variations and modifications fall within the scope of the following claims.

What I claim is:

1. A circuit for maintaining a uniformly constant current flow relative to at least one charge storing device, comprising:

a voltage regulator with a feedback loop disposed therein about an operational amplifier having a noninverting input, an inverting input and an output, while the feedback loop includes only an open circuit disposed therein between a first terminal and a second terminal, with the output being the first terminal and the noninverting input being the second terminal, while the charge storing devices are connected across the open circuit when the uniformly constant current is to flow relative thereto.

2. The circuit of claim 1 wherein a resistance is connected between the noninverting input and ground to set the magnitude of the uniformly constant current.

3. The circuit of claim 1 wherein a reference voltage is applied at the inverting input to set the magnitude of the uniformly constant current.

4. The circuit of claim 3 wherein the reference voltage is derived from a common node between a zener diode and a resistance which are series connected between a dc voltage source and ground.

5. The circuit of claim 1 wherein the charge storing devices are batteries having positive and negative terminals, and a resistance is connected between the noninverting input and ground while a negative reference voltage is applied at the inverting input, with the resistance and voltage being selected according to the uniformly constant current flow desired when the batteries are connected across the open circuit to be discharged, with at least one negative terminal thereof to the output and at least one positive terminal thereof to the noninverting input.

6. The circuit of claim 5 wherein the batteries are arranged in series across the open circuit.

7. The circuit of claim 5 wherein the batteries are arranged in parallel across the open circuit.

* * * * *